UNITED STATES PATENT OFFICE.

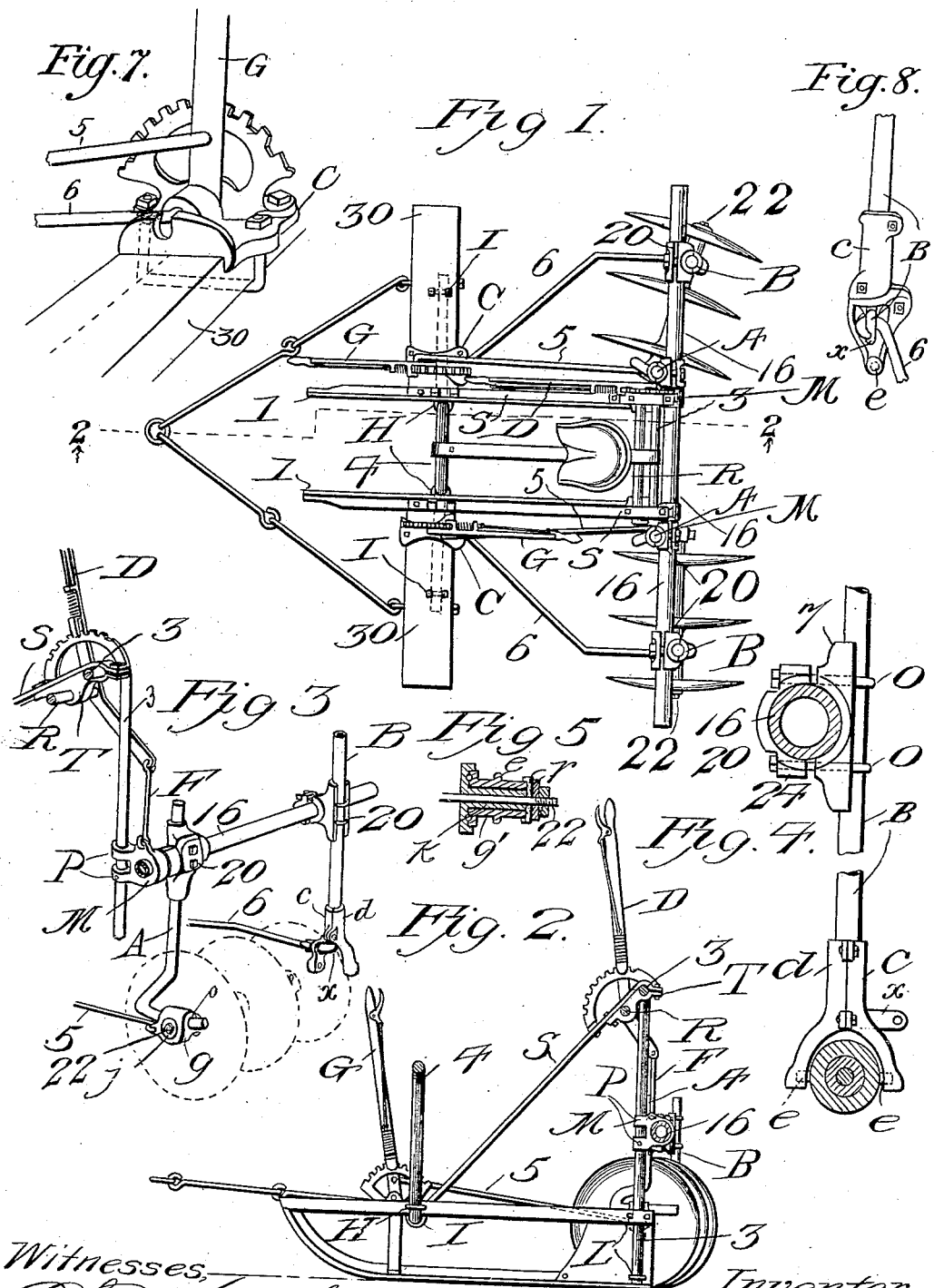

JOHN E. COURTRIGHT, OF INDEPENDENCE, KANSAS.

WEED-CUTTER, CULTIVATOR, AND PULVERIZER.

No. 863,023.     Specification of Letters Patent.     Patented Aug. 13, 1907.

Application filed February 15, 1905. Serial No. 245,666.

*To all whom it may concern:*

Be it known that I, JOHN E. COURTRIGHT, of Independence, in the county of Montgomery and State of Kansas, have invented a new and useful Improvement in Weed-Cutters, Cultivators, and Pulverizers, of which the following is a specification.

My invention relates to cultivators and particularly to that class adapted to the cultivation of listed corn.

The object of my invention is:—to provide a cultivator of simple construction which can be easily guided in the furrow, and which is effective in destroying the weeds between the rows and pulverizing the soil to any depth desired; to provide a cultivator in which there are means for regulating easily the depth to which the soil is cut, the thoroughness with which the soil is turned, and the amount of soil delivered around the plants.

My invention consists in the novel construction and combination of parts which will be hereinafter fully described and claimed.

Reference will be had to the accompanying drawings which form a part of this specification and in which similar letters of reference indicate the corresponding parts of the different figures.

Figure 1 is a top plan view of the cultivator. Fig. 2 is a longitudinal, vertical section of the same on line 2—2 of Fig. 1 showing one half of the sled with the arrangement of disks, levers, etc. Fig. 3 is perspective view of a part of the rear right hand portion of the machine as seen from the rear, showing in part the mechanism for adjusting the disk gangs and for raising and lowering the said disk gangs. Fig. 4 is a detail view of one of the clamps by means of which the upright bars connecting the horizontal bar at the rear of the cultivator frame with the bearings around the disk carrying shafts are adjusted upon said horizontal bar; also a detail view of the castings by means of which the bearings around the outer ends of the disk carrying shafts are pivotally attached to the upright bars. Fig. 5 is a detail sectional view of the bearings and boxings at the outer ends of the disk carrying shafts, taken horizontally and on a line with the disk carrying shaft. Fig. 6 is a longitudinal vertical section, in detail, of the bearings and boxings at the inner ends of the disk carrying shafts, taken on a line with the disk carrying shaft. Fig. 7 is a detail view in perspective of one of the laterally adjustable castings with lever to which the draft rods of the disk gangs are pivotally attached. Fig. 8 is a detail front view of the castings and lower end of the bar which connect the bearings at the pivotal points of the gangs with the horizontal bar above the gangs.

The numerals 1, 1, indicate the light metal frame of the sled runners, which consists of upper frame bars as well as lower runners. The runners are firmly held at the proper distance to straddle the row of young plants, without injury thereto, by the arch cross bars 3 and 4. The arch cross bar 4, is attached to the upper frame bars of the runners 1, 1, by the U-shaped bolts H. Beneath the said frame bars of the runners 1, 1, said arch cross bar 4, is bent outward at right angles to the sled runners and passes directly beneath the draw bars 30, 30, to which bars it is attached at its outer ends by the bolts I, I.

The arch cross bar 3, is attached to both the upper and lower frame bars of the runners 1, 1, by the U-shaped bolts L. Said arch cross bar is further attached to the brace bars S, S, by the castings T, T, together with the bolts through said castings and through said brace bars S, S. Said brace bars S, S, are secured at their forward and lower ends to the upper frame bars of the runners 1, 1, by bolts which pass through said frame bars 1, 1, and also through the inner ends of the draw bars 30, 30.

The horizontal pipe or bar 16, working in the sliding bearings M, M, upon the arch cross bar 3, is firmly held to said arch cross bar by said sliding bearings and yet left free to turn in said bearings. The bearings at the outer ends of the disk carrying shafts 22, are connected with the pipe or bar 16, by means of the upright bars B, B, together with the clamps 20, around said upright bars and the bar 16; together, also, with the castings about the lower part of said upright bars, which castings, c, d, are pivotally attached to the bearings around the disk carrying shafts 22, and also turn pivotally upon said upright bars. The bearings at the inner ends of the disk carrying shafts 22, are connected with the bar 16, by means of the upright bars A, A, which are held at their upper ends to the bar 16 adjustably by clamps 20. Clamps 20, are composed of two castings 7, 24, and the loop headed bolts O, O, as shown in Fig. 4. Between the castings 7 and 24, a slight space is left where said castings come together around the bar 16. The bolts O, O, when tightened, form a double clamp; clamping both the upright bar, A, or B, and the bar 16. By means of these clamps 20, said upright bars A, A, and B, B, can be adjusted up or down on the bar 16; thereby causing either the inner or the outer disks to run the deeper, as desired. At the same time said clamps 20, also furnish the means for adjusting the disk gangs either nearer to or farther from the row cultivated, as desired, by moving said clamps either toward or away from the sled.

The disk gangs are raised or lowered by the lever D, raising or lowering the bar 16. Lever D, is rigidly secured to the rock-shaft R, which rock-shaft furnishes the pivot for said lever, and passing through a bearing in the casting T, beneath the brace bar S, and then directly across and through another bearing in a similar casting T, beneath the brace bar S, on the opposite side of the sled, and is bent backward in a line parallel with the sled runners. Lever D, on the opposite side of the sled has a similar rearwardly extending arm, parallel with the arm of the rock-shaft R. Near the ends of both of these arms are openings engaging the rods F, F. Said rods F, F, turn pivotally in these openings and are, also, pivotally attached, at their lower ends, to the sliding bearings M, M, which work upon the arch cross bar 3, sliding up or down as the disks are raised or lowered. Bar 16, passes through said sliding bearings M, M, and is held firmly to the arch cross bar 3, by said bearings. Said bar 16, is also free to turn in said bearings but is secured by cotters or otherwise from moving in any other way in said bearings. The sliding bearings M, M, when so desired, may be secured rigidly to the arch cross bar 3, by means of set screws working in the openings P, and the lever attachment for raising and lowering the disks removed.
The cutting slant of the disk gangs is changed by the levers G, G, which draw forward or let back the inner ends of the disk carrying shafts 22, 22. The bearings at the inner ends of the disk carrying shafts 22, 22, slide upon the bars A, A, when levers G, G, are thrown forward or backward. Bars A, A, are perpendicular in their upper portion, but in their lower portion they curve forward and downward, and then backward in a horizontal arc, which has, as a radius, the distance between the bars A, and B.
The bearings at the inner ends of the disk carrying shafts are composed of castings j, g, and h, as shown in Fig. 6, and made with ball bearings in order to lessen the friction. Casting g, has, in its upper part, an opening corresponding in shape to the curve of the arc shaped portion of the bars A, A, upon which bars said castings g, slide when levers G, G, are thrown forward or backward. Castings g, also have, in their forward portion, openings pivotally engaging the draw rods 5, 5. Said draw rods are also pivotally connected at their forward ends with the levers G, G.
The bearings around the outer ends of the disk carrying shafts 22, 22, are composed of castings k, g', r, as shown in Fig. 5, and made with ball bearings in order to lessen the friction. Upon casting g', are lugs e, e.
These lugs fit in openings in castings c, d, and pivotally engage said castings as shown in Fig. 4. Castings c, d, are secured to each other by bolts, in such manner as to form a box which turns pivotally about bar B; said bar having at its lower end an arm x extending forward through a horizontal slot, in casting c. Near the end of the arm x in each of these bars B, B, is an opening, whereby said bars pivotally engage draw rods 6, 6. Draw rods 6, 6, are also pivotally connected, at their forward ends, with castings C, C, in such manner as to be free to turn, only up and down. Draw bars 30, 30, furnish a base for the levers G, G; said levers being pivotally connected with castings C, C, which, also, hold segment racks for said levers. Castings C, C, and thereby levers G, G, are adjustable upon draw bars 30, 30, sliding either in toward, or outward from the sled, and clamping at any place desired, by means of U-shaped bolts, which pass around said draw bars and through said castings.
In the operation of the device, the depth to which it is desired to pulverize the soil is regulated by the lever D, raising or lowering the disk gangs. The thoroughness with which the soil is turned, is regulated by the levers G, G, changing the cutting slant of the disk gangs. The relative depth to which the inner and outer disks run is regulated by adjusting bars A or B. up or down with reference to bar 16. The distance from the row at which the disk gangs run is regulated by adjusting clamps 20, either in toward or outward from the sled upon bar 16. If it is desirable to throw the soil away from the row cultivated the disk gangs are changed to opposite sides of the sled, together with the levers G, G, which are then placed at the outer instead of the inner ends of the draw bars 30, 30. When the cultivator is drawn forward the draw bars 30, 30, crush down all stalks and trash so that it may be easily covered up.

Having thus described my invention, what I claim as new and wish to secure by Letters Patent is:—

1. In a cultivator or pulverizer, the combination, with parallel runners having draft bars extending horizontally outward from the forward portion of said runners, and disk gangs located at opposite sides of said runners; of laterally adjustable levers upon said draft bars; draw rods pivotally connected with said levers and with the disk gangs; draw rods extending forward from the pivotal points of said disk gangs to pivotal connections upon said draft bars, all substantially as shown and described.

2. In a cultivator, the combination with parallel runners and draft bars extending out at opposite sides of said runners; of front and rear arch cross bars connecting said runners; said front arch cross bar having arms extending out at opposite sides of said runners and serving as braces for said draft bars; said rear arch cross bar having parallel sides, and also, having brace bars extending forward and downward, from its upper part, and attached at their lower forward ends to the said runners, all substantially as specified.

3. In a cultivator or pulverizer, a frame, disk gangs pivotally attached to the frame, means attaching the disk gangs vertically, slantingly and laterally adjustable to the frame, laterally adjustable castings and segment racks on the frame, levers pivoted to the castings, draft rods extending from the pivotal points of the gangs to said castings and pivoted thereto, and draft-rods extending from said levers to the disk gangs.

4. In a cultivator or pulverizer, a bar which is perpendicular in its upper portion and in the lower portion is curved forward and downward, and then back in a horizontal arc.

5. In a cultivator or pulverizer, the combination with a pivoted disk gang and a bar extending across above the gang, of two bearings on the gang, one of said bearings being at the pivotal point of the gang, bars adjustably clamped to said bar above the gang and extending down and connected with said bearings, the one of the said bars connected with the bearing away from the pivotal point of the gang being bent forward and downward in its lower portion then backward in a horizontal arc.

6. In a cultivator or pulverizer, a frame, a disk gang adjustably attached to the frame, two bearings on the gang, a laterally adjustable casting on the frame, a draft-rod pivoted in said casting and attached to the pivotal point of the gang, a lever on said casting, a draft-rod pivotally attached to said lever and to the bearing of the disk gang.

7. In a cultivator, the combination, with disk gangs working at opposite sides of the row cultivated and having a connecting bar extending across above them; of upright bars adjustably clamped to said connecting bar, and extending downward, and connected with the bearings around the inner and the outer ends of the disk carrying shafts of said disk gangs; said upright bars, which connect with the bearings around the outer ends of said disk carrying shafts, each having an arm extending forward from their lower ends; and draw rods pivotally engaging openings in said arms and extending forward to, and pivotally connected with, the forward part of the cultivator frame; said upright bars, which connect with the bearings at the inner ends, of the disk carrying shafts, of said disk gangs, being bent forward and downward in their lower portion, then horizontally backward, in an arc with a radius equal to the distance between said inner and outer upright bars, all substantially as specified.

8. In a cultivator or pulverizer, a disk gang; bearings at the outer and inner ends of said gang; a bar extending across above said gang; an upright bar attached to the bearings at the outer end of said gang and to the bar above said gang; an upright bar attached to the bearings at the inner end of said gang and to the bar above said gang; clamps attaching said upright bars to said bar above; the said upright bars independently adjustable vertically in said clamps, all substantially as specified.

9. In a cultivator or pulverizer, a disk gang pivoted near one of its ends, a bearing near the opposite end of said gang, a horizontal opening in said bearing, a bar having a horizontal arm arranged for the bearing to slide thereon.

10. In a cultivator with disk gangs, the combination, with a bar above said gangs; of bearings at the outer ends of said gangs; lugs at the front and rear of the bearings; bars extending down from the bar above the gangs to the said bearings and having at their lower ends arms extending forward; castings turning pivotally about said bars and provided in front with slots for the forward extending arms of the said bars, and also, pivotally engaging said lugs; all substantially as specified.

11. In a cultivator or pulverizer having rotary laterally, vertically and slantingly adjustable and reversible disk gangs, a frame, means for attaching said gangs adjustably to the frame consisting of a bar extending across the frame and adjustably attached to the frame, four laterally adjustable clamps on said bar; clamping-bolts through said clamps, means connecting said clamps with the disk gangs; two laterally adjustable castings CC on the frame, and clamping-bolts through said castings; and draft means connecting said castings with the disk gangs.

12. In a cultivator or pulverizer, the combination with parallel runners and bars extending out at opposite sides from said runners of laterally adjustable castings with segment racks upon said bars, and levers pivoted to said castings.

In testimony whereof, I have signed my name to this specification in the presence of two subscribing witnesses.

J. E. COURTRIGHT.

Witnesses:
JAS. G. SMITH,
S. S. ORWIG.